United States Patent [19]

Covington et al.

[11] Patent Number: 4,722,173
[45] Date of Patent: Feb. 2, 1988

[54] COTTON HARVESTER HARVESTING UNIT SUPPORT SYSTEM

[75] Inventors: Michael J. Covington, LaGrange; Jesse H. Orsborn, Clarendon Hills; Robert M. Fachini, Naperville, all of Ill.

[73] Assignee: J. I. Case Company, Racine, Wis.

[21] Appl. No.: 619,094

[22] Filed: Jun. 11, 1984

[51] Int. Cl.[4] .................... A01D 46/08; A01D 67/00
[52] U.S. Cl. .................................. 56/15.9; 56/15.6; 56/208; 56/28
[58] Field of Search ...................... 56/14.9, 15.6, 15.7, 56/15.9, 28, 29, 30, 14.5, 208, 15.8

[56] References Cited

U.S. PATENT DOCUMENTS 2,688,223  9/1954  Hagen et al. .
3,031,828  5/1962  Graham .
3,176,451  4/1965  Hubbard .
4,249,365  2/1981  Hubbard et al. ............... 56/13.2
4,348,856  9/1982  Copley et al. .................. 56/30

FOREIGN PATENT DOCUMENTS 2121181  8/1973  Fed. Rep. of Germany ....... 56/14.9

Primary Examiner—John J. Wilson
Assistant Examiner—John G. Weiss
Attorney, Agent, or Firm—Dressler, Goldsmith, Shore, Sutker & Milnamow, Ltd.

[57] ABSTRACT

The present invention is for a mounting system for supporting harvesting units from the frame of a cotton harvester. The present invention allows greater access to the rear of the harvesting unit while also allowing independent mounting of each harvesting unit.

12 Claims, 3 Drawing Figures

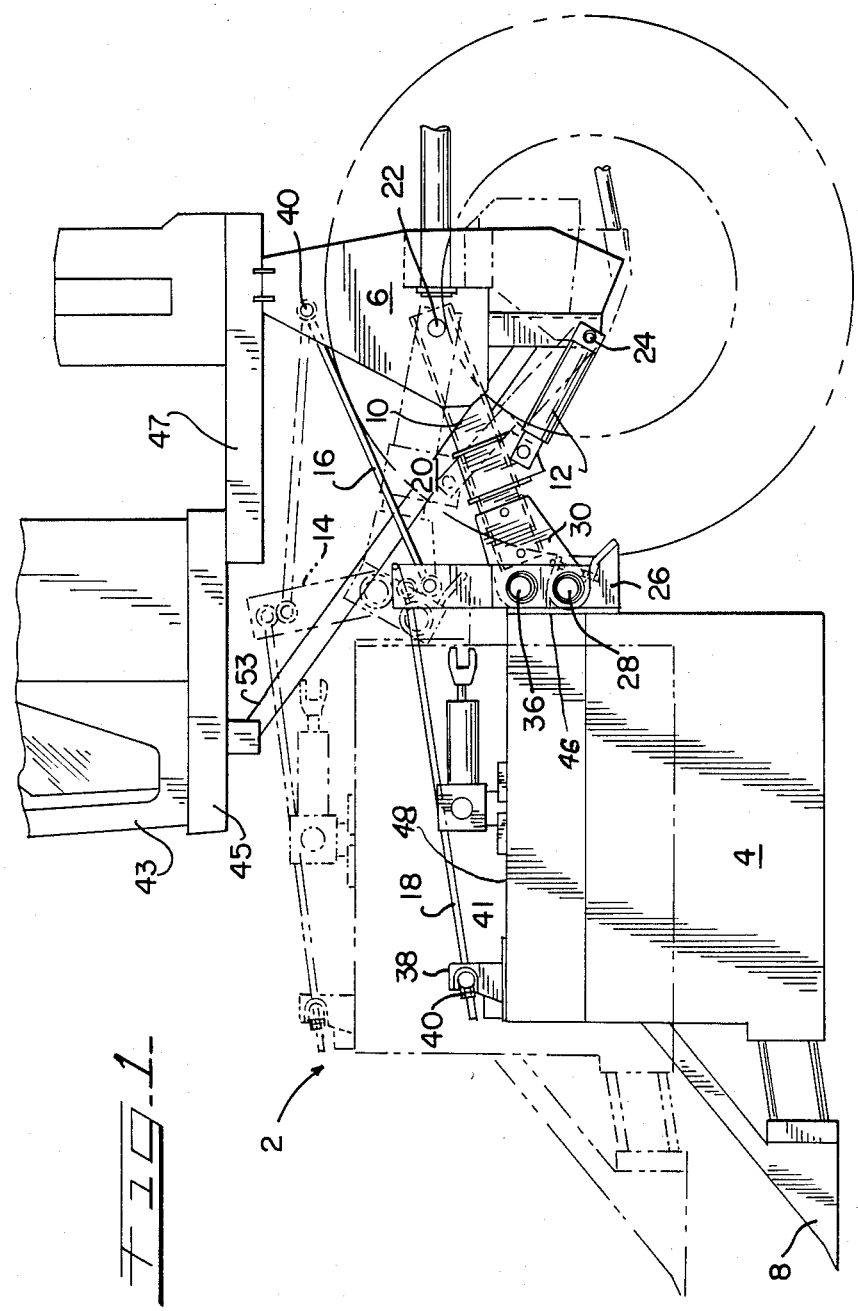

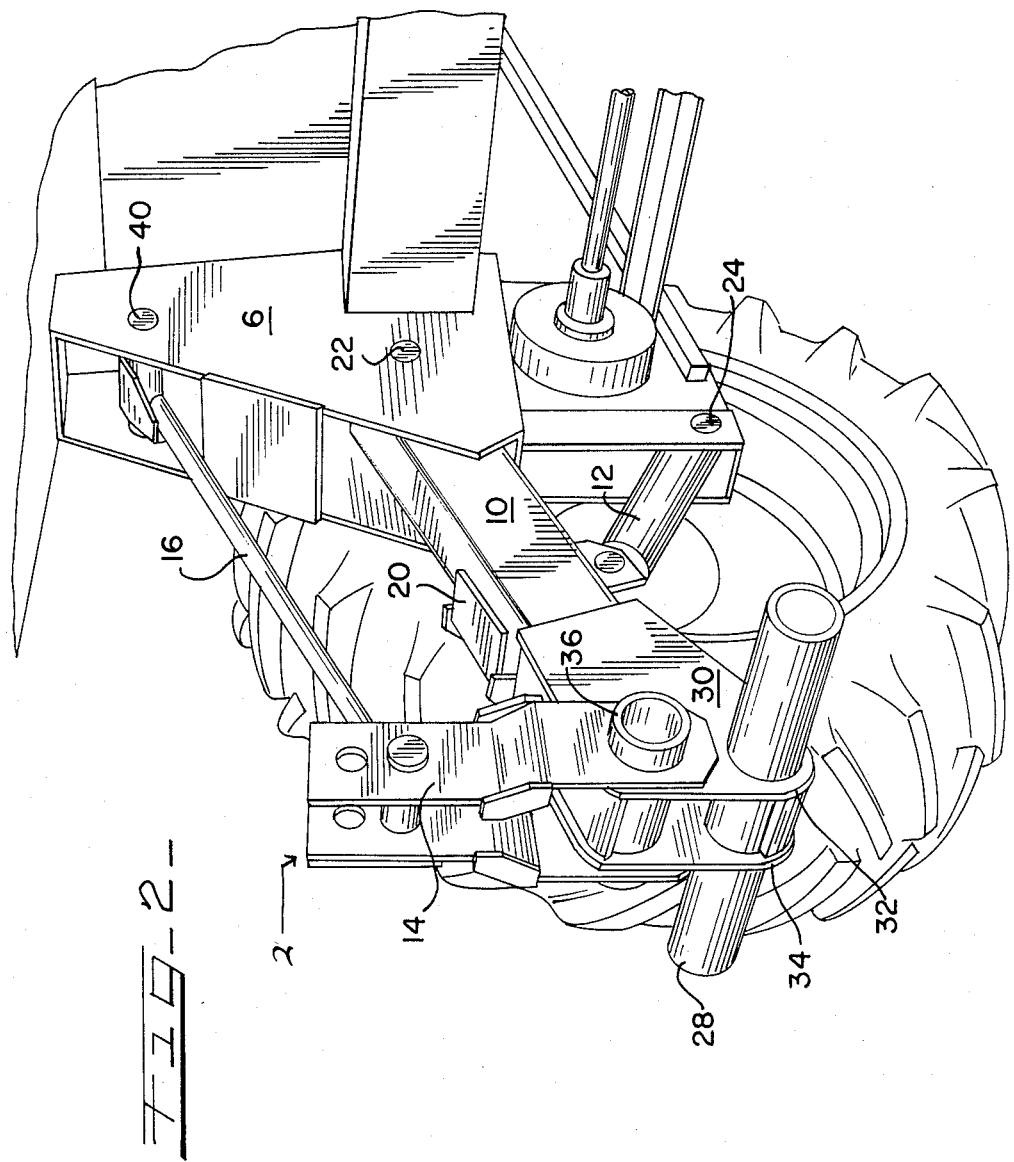

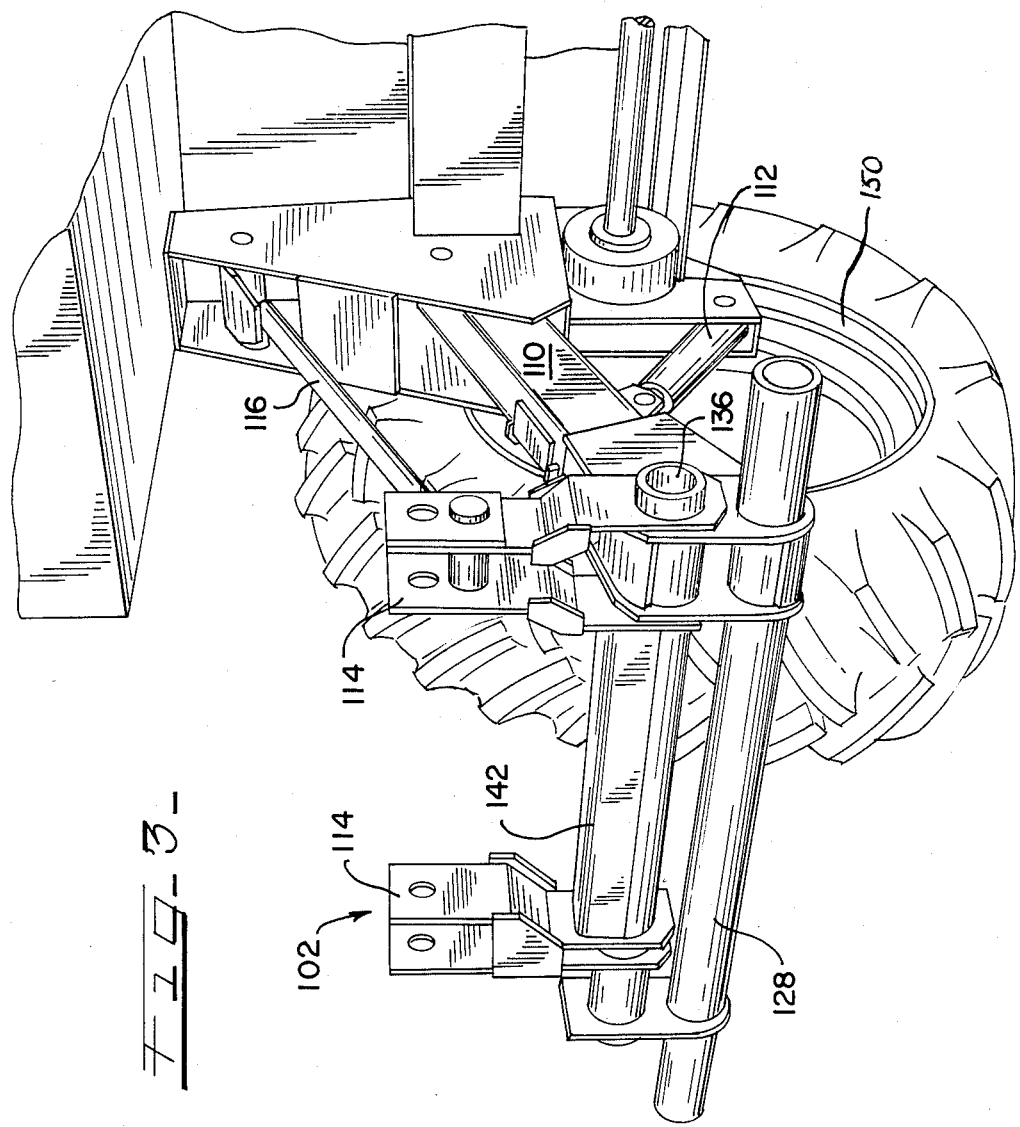

COTTON HARVESTER HARVESTING UNIT SUPPORT SYSTEM

BACKGROUND OF THE INVENTION

Field of the Invention

This invention relates to cotton harvesting machines and more particularly to a mounting system to support the harvesting unit from the frame of the cotton harvesting machine. The present invention is particularly useful in picker and doffer type cotton harvesting machines.

DISCLOSURE STATEMENT

Hubbard et al. U.S. Pat. No. 4,249,365 discloses a support system for a four-row cotton picker. In Hubbard the outboard harvesting units or picking units (also referred to as a drum) are transversely cantilevered from the inboard units using telescoping cross members. The cross members are adjustable to properly position the picking units for various row spacings. The Hubbard cross members are attached to the picking units by an upper rigid beam structure on the adjacent inboard and outboard picking units. The rigid beam structure includes an upper plate, cam support and transverse in fore-and-aft stiffeners.

The Hubbard harvesting machine utilizes stabilizer bars which are pivotally connected between the harvester frame and the inboard picking unit rear adjacent the frame of the cotton harvesting machine. The stabilizer bars help stabilize the picking units and also provide means to adjust the picking unit tilt. Lower mounted stabilizer bars are undesirable in that they can become entangled in the cotton plants or field trash as the harvester travels through the field. Also, for the purposes of picking unit maintenance and cleaning, it is preferable to eliminate the use of stabilizer bars pivotally connected to the picking unit rear adjacent the frame. Another consideration is that in many modern designs of cotton harvesters, the cotton duct which provides an exit for the cotton from the picking unit is often located to the side or to the rear of the picking unit. If the duct becomes clogged manual cleaning is required. The location of the stabilizer bars of Hubbard limits free access to the cotton ducts.

As mentioned previously, the Hubbard cotton harvesting machine mounts the outboard picking unit in a cantilever fashion from the inboard drum. To remove the inboard picking unit for servicing the outboard picking unit must be removed. Removing both picking units simultaneously causes problems due to the bulkiness and weight of the separate harvesting units. Removing the outboard picking unit before the removal of the inboard unit takes additional time, a premium during the harvest season.

In the Hubbard cotton harvester the tilt of the outboard picking unit will have a fixed relationship with the tilt of the inboard picking unit since the inner and outboard picking units are fixably connected. It is sometimes desirable for the tilt of the individual picking units to be independently adjustable of one another, to eliminate differences in tilt angle due to distortion of the supporting structural members.

SUMMARY OF THE INVENTION

To overcome the disadvantages of the aforementioned harvesting machine and of other prior harvesting machines the present invention is brought forth. The present invention comprises a harvesting unit mounting system with five major elements. The first element, a lift arm, is pivotally attached to the vehicle frame. The lift arm is also pivotally attached to the harvesting unit adjacent the frame. To provide the lift of the harvesting unit, a hydraulic cylinder which is pivotally connected to the vehicle frame and lift arm, is provided. Pivotally connected to the end of the lift arm adjacent the harvesting unit, is a tension tube plate. The end of the tension plate generally opposite the lift arm, is connected by an upper tension link to the frame of the harvesting machine. Extending generally opposite the upper tension link is a harvesting unit upper tension link connecting the tension plate with the harvesting unit. In a preferred embodiment, the lift arm is an assembly which includes transversely attached lower lift tube and an upper torsion tube to pivotally attach the lift arm to the harvesting unit and to the tension tube plate.

The present invention is advantageous over prior lift systems in that the overhead rocker lift arm arrangement of prior cotton harvesting machines is eliminated. Eliminating the overhead rocker arm provides for more clearance under the operator's cab allowing greater access to controls and lines under the cab. The lower stabilizer bars are also eliminated, allowing greater access to the rear of the harvesting units for maintenance or for cleaning. Also, there is greater access to the cotton ducts to remove cotton clogs. By locating the tension links above the harvesting unit, the harvesting unit tilt may usually be adjusted from above the harvesting unit in front of the cotton harvester instead of manipulating the harvesting unit from the rear.

In an embodiment of the present invention of a four-row cotton harvester, the harvesting units are independently mounted, thereby eliminating the requirement to remove the outboard harvesting unit before removal of the inboard harvesting unit. The mounting system of the present invention allows for faster harvesting unit removal in case of needed maintenance.

It is an object of the present invention to provide a harvesting unit mounting system wherein the lower stabilizing bars are eliminated. It is also an object of the present invention to provide a harvesting unit mounting system wherein the individual harvesting units may be independently removed. It is a desire of the present invention to provide a harvesting unit support system providing for faster mounting and dismounting of harvesting units. It is a desire of the present invention to provide a harvesting unit support system wherein the tilt of each individual harvesting unit may be set independent of one another. It is a desire of the present invention to provide a harvesting unit mounting system wherein the tilt of the harvesting unit may be maintained constant, regardless of the elevation of the harvesting unit as it is lifted by the mounting system. It is another desire of an embodiment of the present invention to provide a harvesting unit mounting system wherein the tilt of the harvesting unit may vary with the elevation of the harvesting unit. It is still another desire of the present invention to provide a harvesting unit support system which aids in preventing the harvesting unit digging into the ground when encountering uneven field conditions.

Other objects, advantages and desires of the present invention will become apparent to those skilled in the art as the nature of the invention is better understood from the accompanying drawings and detail description.

BRIEF DESCRIPTION OF THE DRAWING

FIG. 1 is a side elevational view of the harvesting unit supported from the frame of a cotton harvester in a lower and upper (phantom line) position;

FIG. 2 is a partial perspective view of the harvesting unit supports of the harvesting unit mounting system of a two-row cotton harvesting machine, with the harvesting unit removed; and FIG. 3 is a partial perspective view of the harvesting unit support mounting the harvesting units on a four-row cotton harvesting machine with the harvesting units removed.

DETAIL DESCRIPTION OF THE DRAWINGS

Referring to FIG. 1 a harvesting unit 4 (sometimes called row unit) is shown adjacent the wheeled frame 6 of the cotton harvesting machine generally of the type shown in the aforementioned Hubbard et al. U.S. Pat. No. 4,249,365. Located near the front of the harvesting unit 4 are a pair of parallel spaced plant lifters 8 (only one shown) which may initially engage the cotton plants. The plant lifters 8 guide the cotton plants into an interior fore-and-aft passageway (not shown) of the harvesting unit 4. Within the harvesting unit 4, harvesting mechanisms remove the cotton from the plants. The harvesting mechanism will often be of the picker spindle drum and doffer drum type (not shown).

To the rear or the side of the harvesting unit 4 are cotton ducts which provide an exit for the cotton from the harvesting unit, however, in the interest of clarity of illustration, the ducts have been deleted from FIG. 1. Above the harvesting unit 4 and mounting system 2 is the operator's cab 43, and forward and rearward platform members 45 and 47. Cab support 53 is provided to support the operator's cab. Underneath the platform members 45 and 47 are various electrical and mechanical controls and lines (not shown).

FIGS. 1 and 2 illustrate the five major components of the mounting system 2. The first element is the lift arm 10, or as the case may be lift arm assembly, which is pivotally connected between harvesting unit 4 and the wheeled harvester frame 6 at point 22. Pivotally connected to the frame at point 24 and to the lift arm 10 is the hydraulic cylinder 12. Hydraulic cylinder 12 angularly displaces lift arm 10, thereby providing the lift and support for the harvesting unit 4. Pivotally attached to the lift arm 10 adjacent the harvesting unit 4 is a tension plate 14. Connecting the tension plate 14 to the frame 6, is an upper tension link 16. Tension plate 14 is also connected with the harvesting unit 4 by harvesting unit upper tension link 18. The upper tension links 18 and 16 cooperate to define the tilt of the harvesting unit 4.

Although not required, it is usually preferable from the point of stability to attach the lift arm 10 to the frame 6 at a point inboard of the two front wheels. In the embodiment illustrated in FIGS. 1 and 2 the lift arm 10 has a collar 20 to provide added strength for the connection to the hydraulic cylinder 12.

To make assembly and disassembly of the harvesting unit 4 to the harvesting machine frame 6 easier, the harvesting unit 4 is provided with a saddle 26. In the embodiment of FIG. 1 saddle 26 is fixably connected by welding or by other means to the harvesting unit's upper portion 46 adjacent the frame 6.

Extending transversely from the lift arm 10 is a lower lift tube 28. (note: Throughout this application the term "tube" is used generally referring to structural members, and such structural members need not be tubular but may be any other shapes utilized as structural members). As mentioned previously the lift arm 10 is pivotally attached to harvesting unit 4. However, the pivotal attachment may be accomplished in a number of ways. In the embodiment of FIGS. 1 and 2 lower lift tube 28 is part of the lift arm assembly and is pivotally attached to saddle 26. Lower lift tube 28 is fixably attached to lift arm 10. The present invention encompasses other means of pivotal attachment apparent to those skilled in the art such as but not limited to allowing pivotal movement between lower lift tube 28 and lift arm 10 or allowing lower lift tube 28 to rotate relative to saddle 26 and central tube 10.

In the embodiment illustrated in FIGS. 1 and 2 the lower lift tube 28 is fitted within a fabricated sleeve 30, which comprises two fixably connected parallel plates 32 and 34 respectively. Extending transversely from the lift arm 10 and being fixably attached to the tension plate 14, is another portion of the lift arm assembly, upper torsion tube 36. Upper torsion tube 36 is also pivotally inserted through sleeve 30. Upper torsion tube 36 is generally aligned in a parallel direction with the lower lift tube 28. The present invention encompasses various modifications which provide for a pivotal connection between tension plate 14 and lift arm 10 and is not limited to the embodiment of FIGS. 1 and 2.

Attaching tension plate 14 to the frame 6 is an upper tension link 16, which in the embodiment of FIG. 1 is a rigid member pivotally connected at both ends. Attaching the tension plate 14 to the harvesting unit 4 is a harvesting unit tension link 18. As shown in FIG. 1, the upper harvesting unit tension link 18 is pivotally connected and rigid. Also, the upper harvesting unit tension link 18 attaches at the harvesting unit roof 48, at the end opposite the frame 6. Furthermore, the harvesting unit tension link 18 has a tilt adjustment means 38. Opposite the frame, the upper harvesting unit tension link 18 is threaded, and by use of a jam nut 40, the effective length of the upper harvesting unit tension may be adjusted. Since the tilt adjustment 38 is located in front of the harvesting unit 4, the tilt adjustment can be easily made in the field. Another advantage of this arrangement is that the tilt of each harvesting unit may be made independent of the other harvesting units. Independent tilt adjustment is critical in four row machines where common lower lift tube 128 and upper torsion tube 136 are utilized to support two or more harvesting units as illustrated in FIG. 3. Since to the exact amount of strain of the lower lift tube and upper torsion tube from loading of the harvesting units may vary due to manufacturing criteria adjustment of the tilt angle of the individual harvesting units will sometimes be required. It is also desirable to change the tilt of harvesting units due to different bed heights of cotton fields.

Adjustment means 38 also serves as a lost motion connection between the harvesting unit 4 and the end of the harvesting unit tension link 18. The lost motion connection prevents the harvesting unit tension link from being placed in a state of compression. If the cotton harvester harvesting unit 4 hits a field obstruction such as a furrow, the harvesting unit tension link's effective length 18 will temporarily be shortened allowing the harvesting unit 4 to pivot backwards.

Adjustment of the upper harvesting unit tension link's length and substitution of the upper tension link 16 defines the mounting system's function of harvesting unit tilt versus the elevation of the harvesting unit (or angular displacement of lift arm 10 with respect with frame 6). A constant tilt regardless of harvesting unit elevation is sometimes desired to maintain the picker spindles in a horizontal plane or the same orbital plane. In some applications due to weight distributions, or due to preventing the harvester digging into uneven ground, it will be advantageous for the tilt of the harvesting unit to change with the position of the lift arm 10. This can be accomplished by relocation of pivot point 40 and/or a substitution of upper tension link 16.

FIG. 3 illustrates one half of the harvesting unit mounting system 102 of a multi-parallel row picker, typically a four-row cotton harvesting machine with the inboard and outboard harvesting units removed. In the mounting system of a four-row cotton harvesting machine each lift arm 110 will support two separate harvesting units. The harvesting unit mounting system will be essentially similar to the previously described mounting system with the exception that the lower lift tube 128 and the upper torsion tube 136 are extended outwardly for the outboard harvesting unit. Even though the lift arm assembly supports an additional harvesting unit, an additional upper harvesting support link 116 or hydraulic cylinder 112 is not required. The mounting system may be designed in such a manner as to make the two harvesting units spaced adjacent one another, with the longitudinal axis of the lift arm 110 extending therebetween. However, it is usually advantageous to allow the lift arm 110 to be connected inboard of the two front wheels. To prevent the front wheels from being moved further out providing for an excessively wide wheel base, the mounting system is usually designed with the inboard harvesting unit closer to the axial center line of the lift arm, with the outboard unit supported on the extended lower lift tube 128 and upper torsion tube 136. The above design allows the lift arm 110 to be mounted inboard of the front wheel 150 and still allow clearance for the outboard harvesting unit of the front tires.

In fabrication of the harvesting unit mounting system, the upper torsion tube 136 and lower lift arms will be assembled in such a manner to allow the weight of the outboard and inboard harvesting units to strain the upper torsion tube and upper lift arm downward to maintain equal height of the inboard and outboard harvesting units. Re-enforcement member 142 is added to upper torsion tube 136 to provide added strength. It is apparent to those skilled in the art that mounting system 102 can be extended inwardly or outwardly to facilitate additional harvesting units. Also, harvesting unit tilt adjustment remains independent since a tension plate 114 is provided for each harvesting unit.

While a few of the embodiments of the present invention have been explained it will be readily apparent to those skilled in the art of the various modifications which can be made of the present invention without departing from the spirit or scope of the this application as it is encompassed by the following claims.

What is claimed is:

1. A cotton harvester with a harvesting unit mounting system for supporting a harvesting unit from a vehicle frame comprising:
    a lift arm pivotally attached to said vehicle frame and pivotally attached to said harvesting unit adjacent said frame;
    angular displacement means for angular displacement of said lift arm;
    a tension tube plate pivotally attached to said lift arm;
    an upper tension link attached to said frame and to said tension tube plate; and
    a rigid harvesting unit tension link pivotally attached to said harvesting unit and said tension tube plate, said harvesting unit tension link is in tension and is attached to said harvesting unit with a lost motion connection to aid in preventing said harvesting unit tension link being placed in compression.

2. A harvesting unit as described in claim 1, wherein said angular displacement means further comprising a hydraulic cylinder pivotally attached to said lift arm and said frame.

3. A cotton harvester as described in claim 2, wherein said angular displacement means further comprising a collar fitted on said lift arm, said hydraulic cylinder being pivotally attached to said collar.

4. A cotton harvester as recited in claim 3, wherein said collar is fixably attached to said lift arm.

5. A cotton harvester as described in claim 1, wherein said harvesting unit tension link is pivotally attached adjacent said harvesting unit's end opposite said vehicle frame, and wherein the harvesting unit tension link has adjusting means to adjust the length of said harvesting unit tension link thereby defining the tilt of said harvesting unit.

6. A cotton harvester for use in field with parallel rows of cotton plants with a harvesting unit mounting system for supporting a harvesting unit from a vehicle frame comprising:
    a saddle fixably attached to said harvesting unit adjacent said frame;
    a lift arm pivotally attached to said saddle and to said frame;
    a hydraulic cylinder, pivotally attached to said frame and to said lift arm for angular displacement of said lift arm;
    a tension plate pivotally attached to said lift arm;
    an upper tension link pivotally attached to said frame and to said tension plate; and
    a harvesting unit tension link pivotally attached to said harvesting unit and to said tension plate.

7. A cotton harvester as described in claim 6, further comprising a lift arm assembly including a lower lift tube transversely attached to said lift arm and being pivotally attached to said saddle, said lift arm assembly further comprising an upper torsion tube transversely and pivotally attached to said lift arm adjacent said saddle, and said upper torsion tube also being attached to said tension plate.

8. A two row cotton harvesting machine with a harvesting unit mounting system for supporting two harvesting units from a vehicle frame comprising:
    a saddle fixably attached to each said harvesting unit adjacent said frame and also adjacent said harvesting unit's upper portion;
    a lift arm pivotally attached to each said respective saddle and to said frame;
    a hydraulic cylinder pivotally attached with said frame and to each said lift arm for angular displacement of said lift arm;

a lower lift tube transversely and fixably attached to each said lift arm providing means of pivotal attachment of said lift arm to said saddle;

an upper torsion tube transversely and pivotally attached to each said lift arm;

a tension tube plate fixably attached to each said upper torsion tube;

an upper rigid tension link pivotally attached to each said tension tube plate and to said frame; and a harvesting unit rigid tension link pivotally attached to said tension tube plate and to said harvesting unit, said harvesting unit tension link being attached to said harvesting unit adjacent said harvesting unit roof opposite said frame.

9. A four row cotton harvester with a harvesting unit mounting system for supporting a first, second, third and fourth harvesting unit from a vehicle frame comprising:

a saddle fixably attached to each said harvesting unit adjacent said frame and also adjacent said harvesting unit's upper portion;

a first lift arm pivotally attached to said frame for supporting said first and second harvesting units;

a second lift arm pivotally attached to said frame for supporting said third and fourth harvesting units;

first and second hydraulic cylinders pivotally attached to said first and second lift arms respectively for independent angular displacement of said lift arms;

first and second lower lift tubes transversely and fixably attached to said first and second lift arms respectively and said first and second lower lift tubes being pivotally attached to the saddles of said first and second harvesting units and said third and fourth harvesting units respectively;

a first and second upper torsion tubes transversely and pivotally attached to said first and second lift arms respectively;

a first and second, and a third and fourth, two piece tension plates fixably attached to said first and second respective upper torsion tubes;

a first, second, third and fourth harvesting unit tension links pivotally attaching said respective harvesting units with said respective tension plates, and wherein said harvesting unit tension links are attached to said harvesting unit adjacent said harvesting unit roof opposite said frame; and a first and second upper tension links pivotally attaching said respective second and third tension plates with said frame.

10. A cotton harvester as described in claim 9, wherein said harvester has two front wheels and said first and second and lift arms are attached to said frame between said two front wheels and wherein said first harvesting unit is outboard of said second harvesting unit and said fourth harvesting unit is outboard of said third harvesting unit.

11. A four row cotton harvester as described in claim 10, wherein the distance from said first and fourth harvesting units to the first and second lift arms axial center lines respectively is greater than the distance from said third and second harvesting units to the first and second lift arms axial center lines respectively and wherein said first and second lower lift tube and upper torsion tube are preformed to undergo deformation by said weight of said first and harvesting units to allow the elevation of said first harvesting unit to equal the elevation of said second harvesting unit and likewise said fourth harvesting unit elevation to the elevation of said third harvesting unit.

12. A four row cotton harvester as described in claim 9, wherein the length of said harvesting unit tension links are independently adjustable.

* * * * *